(12) United States Patent
Pieper et al.

(10) Patent No.: US 7,756,718 B2
(45) Date of Patent: Jul. 13, 2010

(54) SYSTEM AND METHOD FOR ELECTRONIC SOFTWARE DELIVERY AND MANAGEMENT THROUGH CHANNEL PARTNERS

(75) Inventors: Tobid Pieper, Concord, CA (US); Paul Martinelli, Berkeley, CA (US); Richard Northing, Alamo, CA (US); Brian De Vries, Vallelo, CA (US)

(73) Assignee: Intraware, Inc., Orinda, CA (US)

( * ) Notice: Subject to any disclaimer, the term of this patent is extended or adjusted under 35 U.S.C. 154(b) by 1415 days.

(21) Appl. No.: 11/156,192

(22) Filed: Jun. 16, 2005

(65) Prior Publication Data

US 2006/0287904 A1 Dec. 21, 2006

(51) Int. Cl.
*G06Q 10/00* (2006.01)
*G06Q 30/00* (2006.01)
*G06F 17/30* (2006.01)
*G06F 7/00* (2006.01)
*G06F 21/00* (2006.01)

(52) U.S. Cl. .............. 705/1; 705/26; 705/27; 705/51; 705/54; 705/59; 715/234

(58) Field of Classification Search ............. 705/1, 705/26, 27, 51, 59, 54; 715/234
See application file for complete search history.

(56) References Cited

U.S. PATENT DOCUMENTS

| | | | | |
|---|---|---|---|---|
| 5,910,987 | A * | 6/1999 | Ginter et al. | 705/52 |
| 6,092,105 | A * | 7/2000 | Goldman | 709/217 |
| 2001/0037290 | A1* | 11/2001 | Lai | 705/39 |
| 2005/0033652 | A1* | 2/2005 | Brentano et al. | 705/26 |
| 2005/0131833 | A1* | 6/2005 | Martinelli et al. | 705/59 |

OTHER PUBLICATIONS

Intraware screen captures pp. 1-35 obtained using http://www.archive.org dated Jun. 4, 2002, Oct. 17, 2002, Dec. 4, 2002, Dec. 19, 2002, etc.*

Silverman et al., Why Surrender the Future, 20030701, Available Online @ http://www.phoneplusmag.com/articles/371PARTNER1.html, Last Accessed Mar. 2, 2009.*

Channel partner, definition, Available Online @ http://www.webopedia.com/TERM/c/channel_partner.html, Last Accessed Mar. 2, 2009.*

(Continued)

*Primary Examiner*—James P Trammell
*Assistant Examiner*—Daniel L Greene, Jr.
(74) *Attorney, Agent, or Firm*—Michael A. Glenn; Glenn Patent Group (57) ABSTRACT

A system and method for facilitating delivery of software applications from software manufacturers and channel partners to their aggregated customer base are described. The system enables both direct customers of software manufacturers and customers of channel partners to receive electronic delivery of digital assets and licenses from a single electronic software delivery site. The system enables software manufacturers to uniquely define the use of the electronic software and license delivery service for each of their associated channel partners, including defining whether the channel partner can submit orders directly to the system and to define limits on such orders, to specify which products from the manufacturer's catalog is a channel partner allowed to deliver, and to define which reporting information the manufacturer may access for data submitted by each channel partner.

6 Claims, 7 Drawing Sheets

OTHER PUBLICATIONS

Channel, definition, Available Online @ http://www.webopedia.com/TERM/c/channel.html, Last Accessed Mar. 2, 2009.*

VAR, definition, Available Online @ http://www.webopedia.com/TERM/V/VAR.html, Last Accessed Mar. 2, 2009.*

OEM, definition, Available Online @ http://www.webopedia.com/Term/O/OEM.html, Last Accessed Mar. 2, 2009.*

Iannella, Renato, Digitalo Rights Management (DRM) Artchitectures, Available Online @ http://www.dlib.org/dlib/june01/iannella/06iannella.html, Last Accessed Mar. 2, 2009.*

* cited by examiner

SYSTEM AND METHOD FOR ELECTRONIC SOFTWARE DELIVERY AND MANAGEMENT THROUGH CHANNEL PARTNERS

TECHNICAL FIELD

The invention relates to storage and delivery of digital data objects such as, for example, software applications and, more particularly, to a system and method for facilitating delivery of software applications from software manufacturers and channel partners, such as, for example, resellers or distributors, to their aggregated customer base.

BACKGROUND OF THE INVENTION

Digital delivery has emerged as an efficient and profitable method of distributing digital goods such as software. While some suppliers of digital goods offer simple downloads from their web sites, these services provide only limited value to the supplier and the supplier's customers. There is a growing demand from end-users for increased services and from suppliers for better management and control of the complete delivery process. Increasingly, digital goods involve frequent updates, bug fixes, patches, and release notifications, resulting in exceedingly complex product relationships.

Prior attempts to provide efficient mechanisms for software delivery involved exclusive submission of orders by software manufacturers and electronic delivery of software to direct customers of the manufacturers, as well as to customers of the manufacturers' respective channel partners, such as, for example, their resellers and distributors. The added order processing overhead imposed on the software manufacturers resulted in the manufacturers gaining access to each channel partner's customer base.

Therefore, there is a need to provide a system and method for enabling both direct customers of software manufacturers and customers of channel partners to receive electronic delivery of digital assets and licenses from a single electronic software delivery site. There is also a need to provide a system and method for enabling software manufacturers to uniquely define the use of the electronic software and license delivery service for each of their associated channel partners, such as, for example, to define whether the channel partner can submit orders directly to the system and to define limits on such orders, to specify which products from the manufacturer's catalog is a channel partner allowed to deliver, and to define which reporting information the manufacturer may access for data submitted by each channel partner. There is a further need for a system and method for providing predetermined access to the reporting information for the software manufacturer and their associated channel partners, as described in further detail below.

SUMMARY OF THE INVENTION

A system and method for facilitating delivery of software applications from software manufacturers and channel partners to their aggregated customer base are described. The system enables both direct customers of software manufacturers and customers of channel partners to receive electronic delivery of digital assets and licenses from a single electronic software delivery site. The system enables software manufacturers to uniquely define the use of the electronic software and license delivery service for each of their associated channel partners, such as, for example, to define whether the channel partner can submit orders directly to the system and to define limits on such orders, to specify which products from the manufacturer's catalog is a channel partner allowed to deliver, and to define which reporting information the manufacturer may access for data submitted by each channel partner.

DETAILED DESCRIPTION

Figure 1:
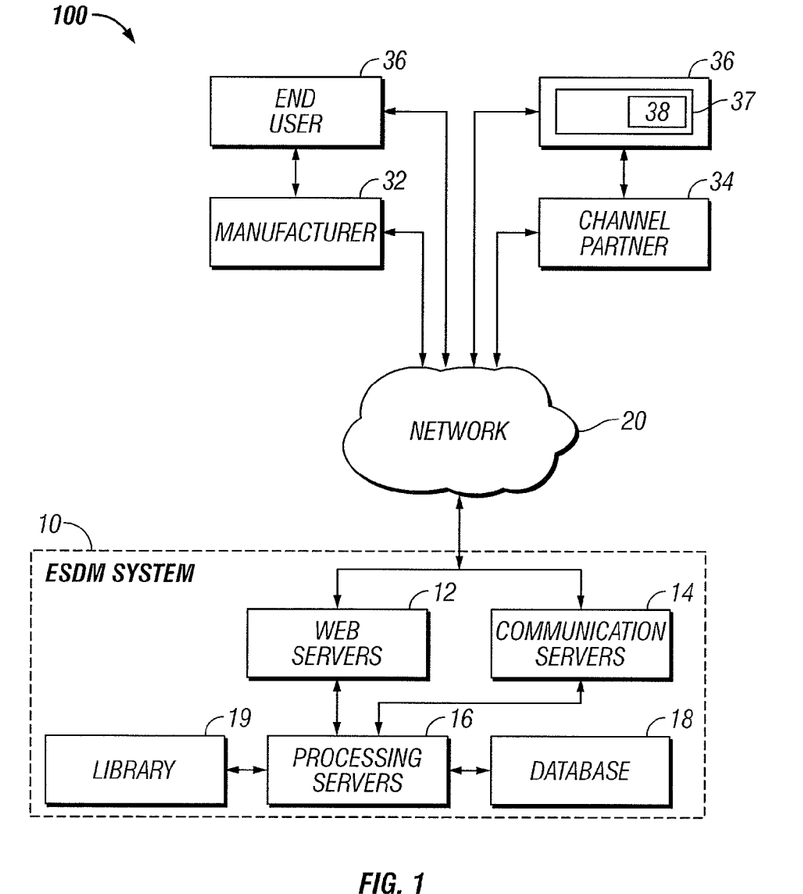
FIG. 1 is a block diagram illustrating an exemplary network environment including an electronic software delivery and management (ESDM) system for facilitating delivery of software applications from software manufacturers and channel partners to their aggregated customer base, according to one embodiment of the invention.

One aspect of the invention concerns an electronic software delivery and management (ESDM) system, which may be embodied by various hardware components and interconnections, with one example being described by the exemplary network environment 100 of FIG. 1. The system 100 includes various subcomponents, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit, and signal bearing medium.

Basically, the environment 100, as illustrated in FIG. 1, includes multiple users (exemplified by users 36) and an ESDM system 10. The users 36 may also be referred to as a "client." The ESDM system 10 may be accessed by a client program 38, such as a browser, e.g. the Internet Explorer browser distributed by Microsoft Corporation of Redmond, Wash., that executes on a client machine 37 residing at the user's 36 site and accesses the system 10 via a network 20, such as, for example, the Internet. Other examples of networks that a client may utilize to access the system 10 includes a wide area network (WAN), a local area network (LAN), a wireless network, e.g. a cellular network, the Plain Old Telephone Service (POTS) network, or other known networks. The users 36 seek access to digital objects stored in a library 19, having earlier subscribed to (or been entitled by the owner or developer of the digital objects) to ESDM services offered by an ESDM entity that operates the ESDM system 10.

The environment 100 further includes multiple digital object manufacturers, such as, for example, software applications manufacturers (exemplified by manufacturer 32) and multiple channel partners (exemplified by channel partner 34), which also access the system 10 via the network 20. In one embodiment, the channel partner 34 may be a large entity in a predetermined business relationship with the manufacturer 32, such as, for example, a distributor of software applications or an original equipment manufacturer (OEM), which is enabled to access the system 10 and to place and process orders for the associated end users 36, as described in further detail below. Alternatively, the channel partner 34 may be a small entity in a predetermined business relationship with the manufacturer 32, such as, for example, an application partner of the manufacturer 32. For purposes of the invention, a channel partner shall include, but is not limited to resellers and distributors of a manufacturer's products. The manufacturers 32 and channel partners 34 access the system 10 via corresponding client machines residing at their respective sites.

The system 10 further includes one or more of a number of types of front-end web servers 12, such as, for example, web page servers, which deliver web pages to multiple users, picture servers, which deliver images to be displayed within the web pages, and content servers, which dynamically deliver content information to the users 36, the manufacturers 32 and the channel partners 34. In addition, the system 10 may include communication servers 14 that provide, inter alia, automated electronic mail (email) communications to/from users 36, manufacturers 32, and channel partners 34, and automated real-time communications, such as, for example, instant messaging (IM) functionality.

The system 10 further includes one or more back-end servers, such as, for example, processing servers 16 or FTP servers, for enabling functionality of the system 10, specifically for facilitating delivery of digital objects, such as, for example, software applications, from software manufacturers 32 and channel partners 34 to their aggregated customer base (end users 36), as described in further detail below, and other known back-end servers configured to enable functionality of the system 10. The processing servers 16 are further coupled to a library 19, which stores the digital objects, and a database 18, which may, in one embodiment, be implemented as a relational database, and which contains data related to the users 36, the manufacturers 32, and the channel partners 34, as described in further detail below. In an alternative embodiment, the database 18 may be implemented as a collection of objects in an object-oriented database.

In one embodiment, the web servers 12 may be implemented by a variety of known machines, such as computer workstations, personal computers, etc. The web servers 12 also perform specific tasks such as presenting a web page providing instructions for users seeking access to digital objects in the library, authenticating users according to the web server access codes, generating temporary FTP access codes for authenticated users' use at the servers 16, and redirecting authenticated users to the servers 16.

The servers 16 comprise some or all of one or more digital data storage machines, such as a UNIX, LINUX, MICROSOFT NT, MICROSOFT WINDOWS operating systems. The processing servers 16 perform specific tasks such as authenticating users according to temporary access codes and, upon successful authentication, making digital objects from the library 19 available to the users pursuant to a predetermined mapping.

In one embodiment, the ESDM system 10 serves to manage discovery and delivery of digital objects from the library 19 to users 36 that are authorized to receive such objects by subscription, contract, payment, or other arrangement. As a particular example, the ESDM system 10 may be implemented using the hardware structure (with various changes according to the present disclosure) used to implement the SubscribeNet® service of Intraware, Inc., of Orinda, Calif., which has been in commercial use for some time.

The library 19 contains many different stored digital objects such as software, data constructs, or other machine readable digital objects. The library 19 comprises some or all of one or more data storage devices, machines, physical or logical storage constructs, etc, such as, for example, software programs, updates, revisions, and the like. For instance, a third party software producer may contract with the entity operating the ESDM system 10 to provide authorized users with access to that third party's software applications.

Figure 2:
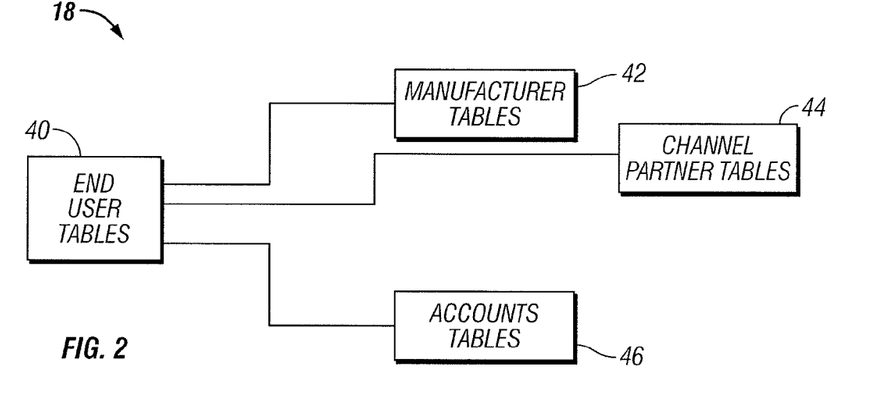
FIG. 2 is a block diagram illustrating a database, which at least partially implements and supports the ESDM system, according to one embodiment of the invention.

FIG. 2 is a block diagram illustrating a database 18, which at least partially implements and supports the ESDM system 10, according to one embodiment of the invention. The database 18 may, in one embodiment, be implemented as a relational database, and includes a number of tables having entries, or records, that are linked by indices and keys. In an alternative embodiment, the database 18 may be implemented as a collection of objects in an object-oriented database, or as a file system, linked list, directory server (e.g., LDAP), WINDOWS operating system domain controller, or other suitable construct.

As illustrated in FIG. 2, the database 18 contains various metadata relating to operation of the web servers 12 and processing servers 16. Central to the database 18 are one or more user tables 40, which contain records for each entity or user of the system 10. The database 18 also includes accounts tables 46, which may be linked to the user tables 40 and may be populated with account, product, and/or order information related to each user 32, 34, 36 of the system 10.

In one embodiment, the user tables 40 may include web server access codes, comprising a list of recognized users (for example by user ID) and password or other login information required to utilize the web site supported by the web servers 12. The user tables 40 may also contain a mapping of which users are authorized to access which of the stored digital objects contained in the library 19. Depending upon user activity at any time, the database 18 may also contain various temporary FTP access codes, generated by the web servers 12 for users to utilize in logging in to the system 10.

The database 18 may include a number of other tables, which may also be linked to the user table 40, for example, tables specifically provided to enable an exemplary embodiment of the present invention. One or more manufacturer tables 42 are configured to store data related to the manufacturers 32 allowed to access the system 10 via the network 20, such as, for example, manufacturer codes, IDs, passwords, and other information. Furthermore, one or more channel partner tables 44 are configured to store data related to the channel partners 34 allowed to access the system 10 via the network 20, such as, for example, unique channel partner codes directly associated with one or more manufacturer codes representing specific manufacturers 32.

In one embodiment, each software manufacturer 32 controls the actions that an associated channel partner 34 may perform while accessing the system 10 by defining in the partner tables 44 which of the existing permissions apply to the respective channel partner 34. For example, the manufacturer 32 may define accounts permissions, which enable the channel partner 34 to add and modify accounts, order permissions, which enable the channel partner 34 to process and modify orders submitted by the end users 36 and/or by the channel partner 34, and product management permissions, which enable the channel partner 34 to add and modify product information stored in the library 19.

In one embodiment, each manufacturer 32 controls each channel partners' 34 access to account, order, or product information that has originated from the respective manufacturer 32 by electing to share such information with specified channel partners 34. Thus, each account, product, or order in the accounts tables 46 is configured to support multiple codes, manufacturer codes, channel partner codes, etc., with a specific manufacturer code assigned as the "owner." In an alternate embodiment, each channel partner 34 controls each manufacturer's 32 access to account, order, or product information that has originated from the respective channel partner 34 by electing to share such information with specified manufacturers 32. Thus, each account, product, or order in the accounts tables 46 is configured to support multiple codes, manufacturer codes, channel partner codes, etc., with a specific channel partner code assigned as the "owner."

In one embodiment, in a single blind channel partner model, the manufacturer 32 may provide several access options to the channel partner 34, such as a no access option, wherein end user accounts and orders are assigned to the channel partner 34, but are managed by the manufacturer 32, a view access option, wherein the channel partner 34 would be able to view account and order information associated with its specific code, an order entry option, wherein the channel partner 34 may create accounts and orders and their creation would be associated to the corresponding channel partner 34, and an order shipment option, wherein manufacturers 32 would not ship the requested products to the end user 36 until the channel partner 34 transmits a purchase order to the manufacturer 32. In this final option, the orders entered by the channel partner 34 would be held until the manufacturer 32 releases the order by transmitting a license key or other form of release.

Figure 3:
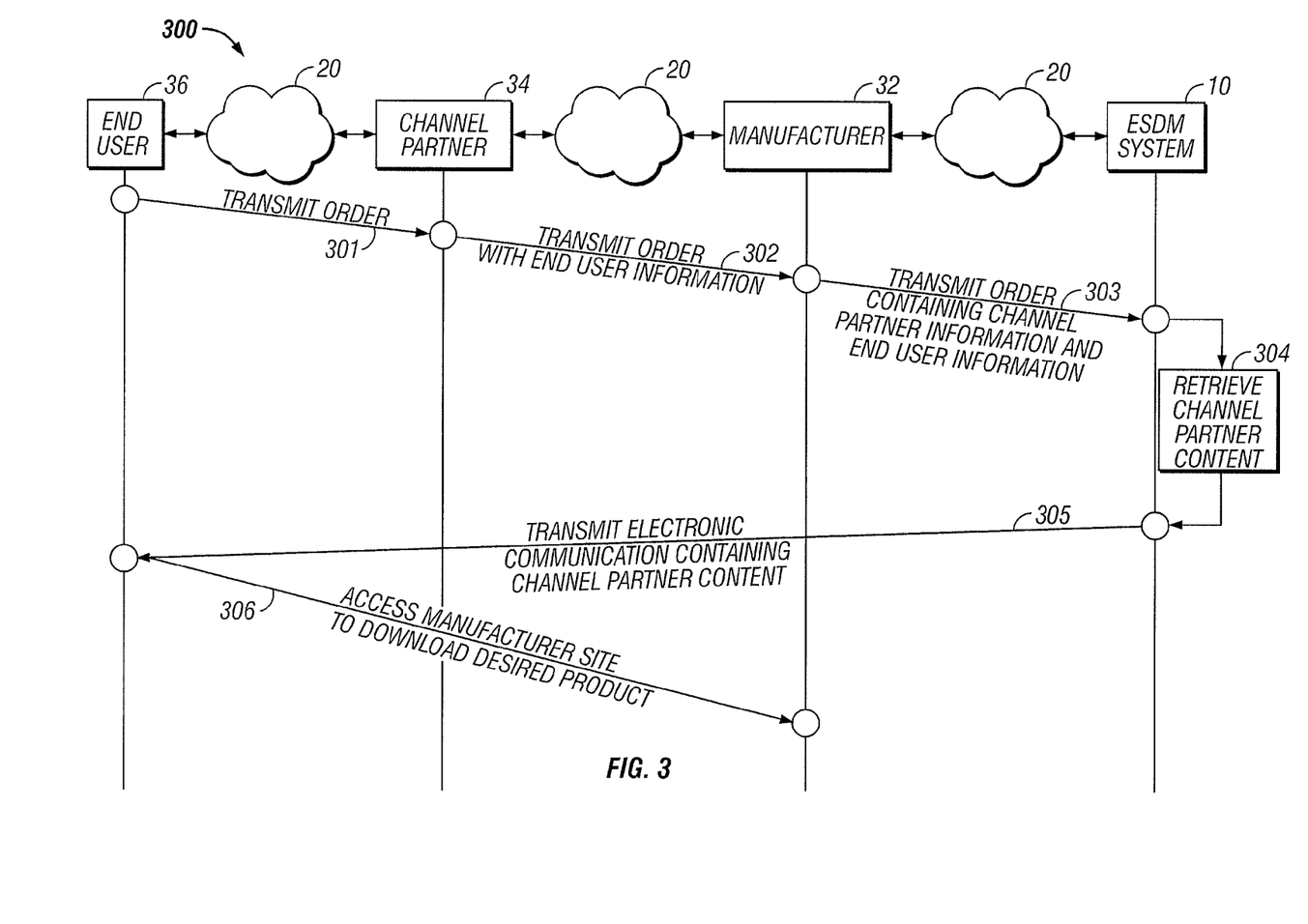
FIG. 3 is an interaction diagram illustrating a sequence of interactions for facilitating delivery of software applications from software manufacturers and channel partners to their aggregated customer base, according to one embodiment of the invention.

FIG. 3 is an interaction diagram illustrating a sequence of interactions for facilitating delivery of software applications from software manufacturers and channel partners to their aggregated customer base, according to one embodiment of the invention. As illustrated in FIG. 3, the sequence 300 commences at block 301 where the end user 36 transmits an order to the channel partner 34. In one embodiment, subsequent to required authentication steps, the respective client machine 37 communicates with the channel partner 34 via the network 20 and transmits the order to the channel partner 34. Alternatively, the client machine 37 may communicate with the channel partner 34 directly and may submit the order through a directly established connection.

At block 302, the channel partner 34 transmits the purchase order to the manufacturer 32 and includes the end user shipping information. At block 303, the manufacturer 32 receives the purchase order from the channel partner 34 and forwards the order to the ESDM system 10. In one embodiment, the manufacturer 32 also transmits associated channel partner information, such as, for example, a channel partner code or identifier, and the end user shipping information. If necessary, the manufacturer 32 may modify the end user information prior to placing the order with the system 10.

At block 304, in one embodiment, the system 10 receives the order from the manufacturer 32 and retrieves from the database 18 channel partner content and other specific information corresponding to the transmitted channel partner identifier. In one embodiment, the processing servers 16 within the system 10 access the database 18 to retrieve the channel partner information.

At block 305, the system 10 transmits an electronic communication to the end user containing the channel partner content and order access information. In one embodiment, the processing servers 16 transmit the electronic communication, such as, for example, an electronic mail message, to the end user 36 via the communication servers 14 and the network 20 and incorporate the channel partner content into the message. Alternatively, the processing servers 16 may also send a copy of the electronic message to the channel partner 34.

Finally, at block 306, the end user 36 accesses the manufacturer site to download the requested product based on the order access information contained within the electronic message. In one embodiment, the client program 38 within the client machine 37 accesses the manufacturer site and requests download of the requested product. The system 10 updates the manufacturer web site to include the channel partner 34 content and other specific information, such that the site presents the end user 36 with a view of the corresponding channel partner 34.

In the sequence 300 illustrated in FIG. 3, the manufacturer 32 has complete view and update access of the account and order information of the end user 36, while the channel partner 34 has a view-only access of the information.

Figure 4:
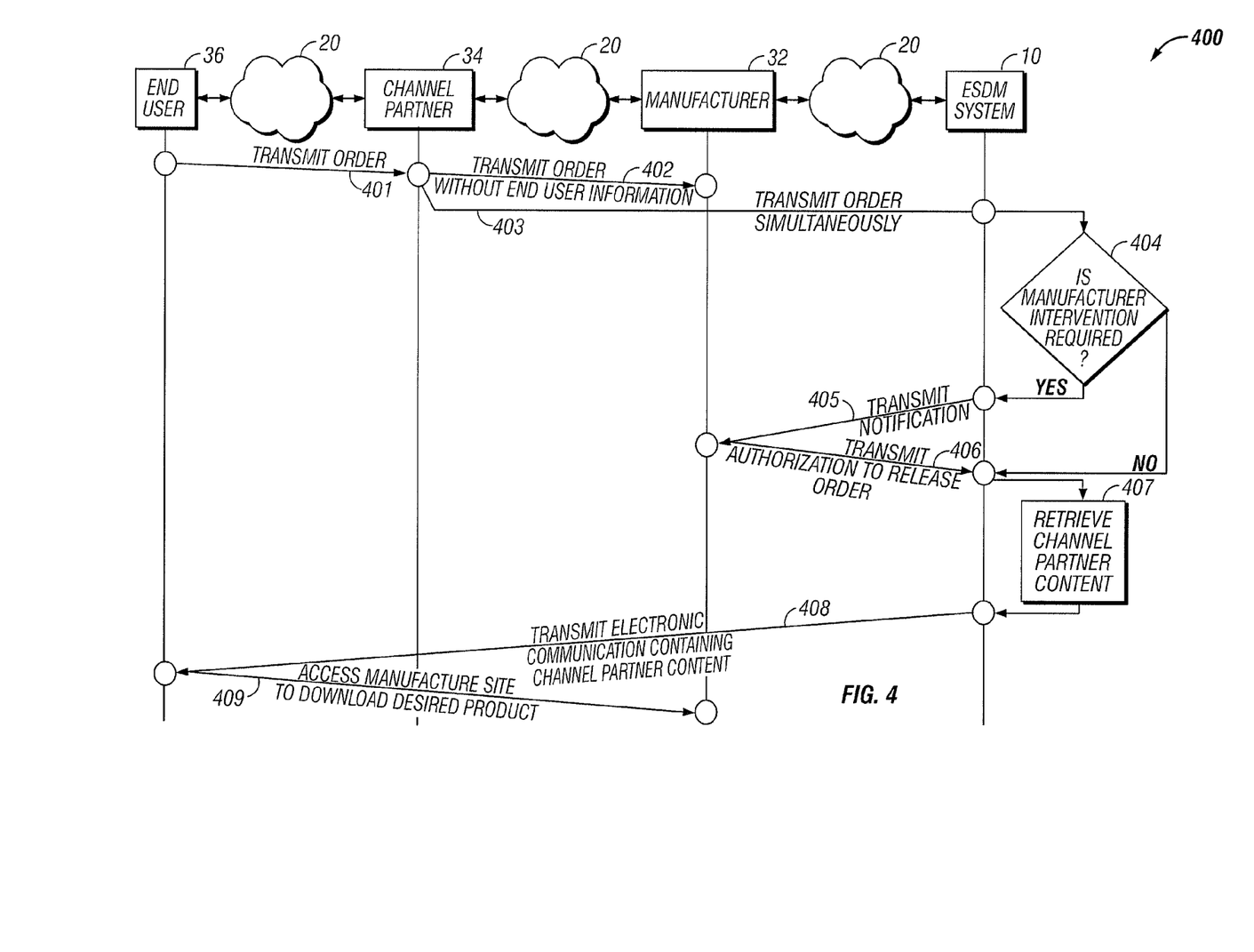
FIG. 4 is an interaction diagram illustrating a sequence of interactions for facilitating delivery of software applications from software manufacturers and channel partners to their aggregated customer base, according to an alternate embodiment of the invention.

FIG. 4 is an interaction diagram illustrating a sequence of interactions for facilitating delivery of software applications from software manufacturers and channel partners to their aggregated customer base, according to an alternate embodiment of the invention. As illustrated in FIG. 4, the sequence 400 commences at block 401 where the end user 36 transmits an order to the channel partner 34. In one embodiment, subsequent to required authentication steps, the respective client machine 37 communicates with the channel partner 34 via the network 20 and transmits the order to the channel partner 34. Alternatively, the client machine 37 may communicate with the channel partner 34 directly and may submit the order through a directly established connection.

At block 402, the channel partner 34 transmits the purchase order to the manufacturer 32 without the end user shipping information. At block 403, the channel partner 34 simultaneously forwards the purchase order to the ESDM system 10. In one embodiment, the channel partner 34 also transmits associated channel partner information, such as, for example, a channel partner code or identifier, and the end user shipping information with the purchase order.

At block 404, a decision is made if intervention by the manufacturer 34 is required during processing of the order. In one embodiment, if the manufacturer 34 does not ship the requested product until it receives an order containing end user shipping information from the channel partner 32, the processing servers 16 place a hold on the order received from the channel partner 34 until a release is received from the manufacturer 34.

If intervention by the manufacturer 34 is required, at block 405, the system 10 transmits a notification to the manufacturer 34. In one embodiment, the processing servers 16 transmit an electronic notification containing the held order information to the manufacturer 34 through the communication servers 14 and the network 20. At block 406, the manufacturer 34 transmits an authorization to release and fulfill the order, such as, for example, through transmission of a license key and/or a shipping order. The processing servers 16 receive the authorization to release the order from the manufacturer 34.

Otherwise, if intervention by the manufacturer 34 is not required, at block 407, the system 10 retrieves from the database 18 channel partner content and other specific information corresponding to the transmitted channel partner identifier. In one embodiment, the processing servers 16 within the system 10 access the database 18 to retrieve the channel partner information.

At block 408, the system 10 transmits an electronic communication to the end user 36 containing the channel partner content and order access information. In one embodiment, the processing servers 16 transmit the electronic communication, such as, for example, an electronic mail message, to the end user 36 via the communication servers 14 and the network 20 and incorporate the channel partner content into the message. Alternatively, the processing servers 16 may also send a copy of the electronic message to the channel partner 34.

Finally, at block 409, the end user 36 accesses the manufacturer site to download the requested product based on the order access information contained within the electronic message. In one embodiment, the client program 38 within the client machine 37 accesses the manufacturer site and requests download of the requested product. The system 10 updates the manufacturer web site to include the channel partner 34 content and other specific information, such that the site presents the end user 36 with a view of the corresponding channel partner 34.

In the sequence 400 illustrated in FIG. 4, the manufacturer 32 and the channel partner 34 have complete view and update access of the account and order information of the end user 36.

While the embodiments illustrated in FIGS. 3 and 4 pertain to a single blind channel partner model, in an alternate embodiment, in a double blind channel partner model, the manufacturer 32 cannot access channel partner end user accounts and other end user information and will have only limited access to the order information. The order information provided to the manufacturer 32 may include an order number, part numbers, quantity, dates, and license keys, but may not contain account information, such as name and address of the end user. As a result, the manufacturer 32 may only access channel partner orders by channel partner codes and other specific information related to the channel partner 34.

In this case, the access options of the channel partner 34 include a view access option, wherein the channel partner 34 would be able to view account and order information associated with its specific code, an order entry option, wherein the channel partner 34 may create accounts and orders and their creation would be associated to the corresponding channel partner 34, and an order shipment option, wherein manufacturers 32 would not ship the requested products to the end user 36 until the channel partner 34 transmits a purchase order to the manufacturer 32. In this final option, the orders entered by the channel partner 34 would be held until the manufacturer 32 releases the order by transmitting a license key or other form of release.

Figure 5:
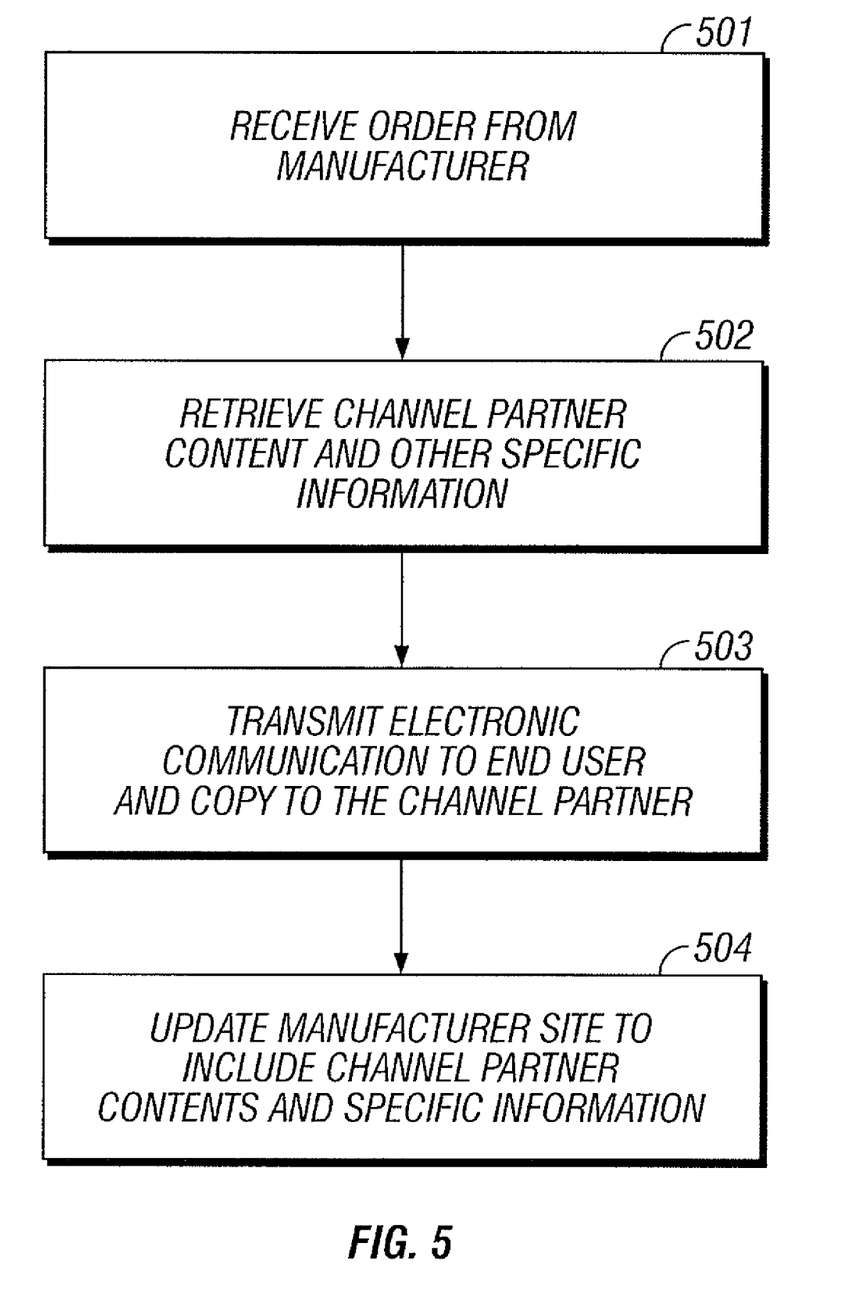
FIG. 5 is a flow diagram illustrating a method for facilitating delivery of software applications from software manufacturers and channel partners to their aggregated customer base, according to one embodiment of the invention.

FIG. 5 is a flow diagram illustrating a method for facilitating delivery of software applications from software manufacturers and channel partners to their aggregated customer base, according to one embodiment of the invention. As illustrated in FIG. 5, at processing block 501, a purchase order is received from the manufacturer 32, the order containing channel partner 34 information and end user 36 information.

At processing block 502, channel partner content and associated information is retrieved from the database 18. At processing block 503, an electronic communication is transmitted to the end user 36 and a copy of the communication is transmitted to the channel partner 34. Finally, at processing block 504, the manufacturer's web site is updated to include the channel partner content and associated channel partner information.

Figure 6:
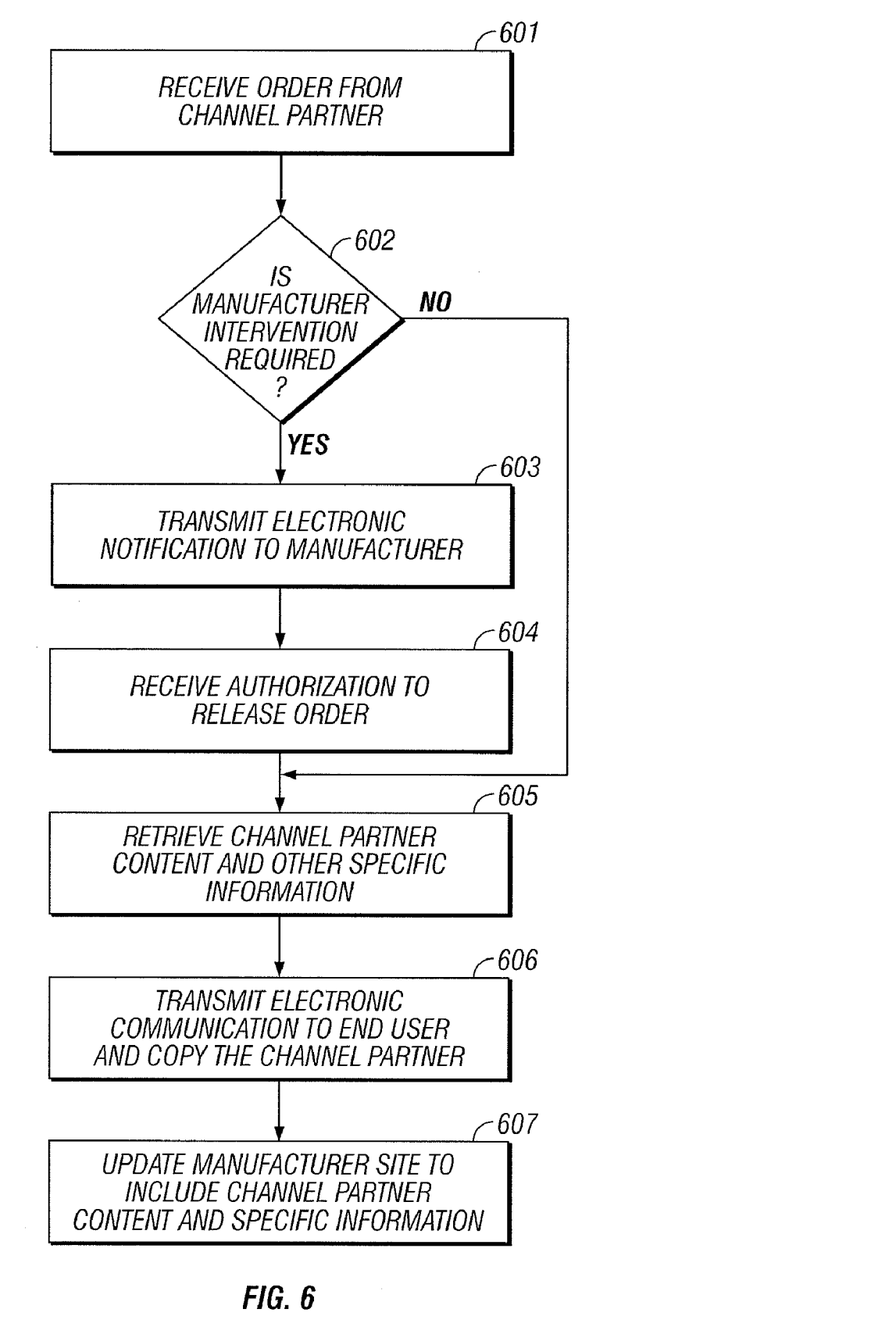
FIG. 6 is a flow diagram illustrating a method for facilitating delivery of software applications from software manufacturers and channel partners to their aggregated customer base, according to an alternate embodiment of the invention.

FIG. 6 is a flow diagram illustrating a method for facilitating delivery of software applications from software manufacturers and channel partners to their aggregated customer base, according to an alternate embodiment of the invention. As illustrated in FIG. 6, at processing block 601, a purchase order is received from the channel partner 34, the order containing channel partner 34 information and end user 36 information.

At processing block 602, a decision is made if intervention by the manufacturer 34 is required during processing of the order. If intervention by the manufacturer 34 is required, at processing block 603, an electronic notification is transmitted to the manufacturer 34. At processing block 604, an authorization to release and fulfill the order, such as, for example, a license key and/or a shipping order is received from the manufacturer 34.

Otherwise, if intervention by the manufacturer 34 is not required, at processing block 605, channel partner content and other specific information corresponding to the transmitted channel partner identifier are retrieved from the database 18. Next, at processing block 606, an electronic communication is transmitted to the end user 36, the communication containing the channel partner content and order access information.

Finally, at processing block 607, the manufacturer web site is updated to include the channel partner 34 content and other specific information, such that the site presents the end user 36 with a view of the corresponding channel partner 34.

Figure 7:
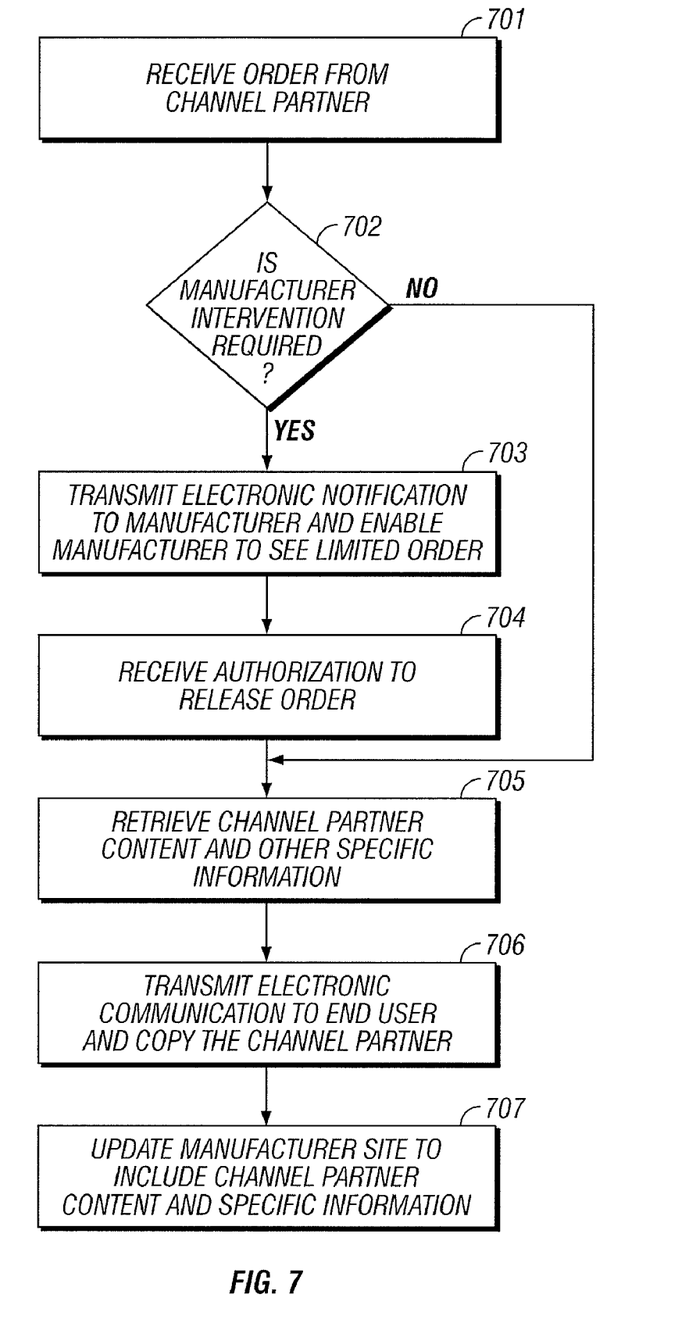
FIG. 7 is a flow diagram illustrating a method facilitating delivery of software applications from software manufacturers and channel partners to their aggregated customer base, according to another alternate embodiment of the invention.

FIG. 7 is a flow diagram illustrating a method for facilitating delivery of software applications from software manufacturers and channel partners to their aggregated customer base, according to another alternate embodiment of the invention. As illustrated in FIG. 7, at processing block 701, a purchase order is received from the channel partner 34, the order containing channel partner 34 information and end user 36 information.

At processing block 702, a decision is made if intervention by the manufacturer 34 is required during processing of the order. If intervention by the manufacturer 34 is required, at processing block 703, an electronic notification is transmitted to the manufacturer 34 and the manufacturer 34 is enabled to see limited order information only. At processing block 704, an authorization to release and fulfill the order, such as, for example, a license key and/or a shipping order is received from the manufacturer 34.

Otherwise, if intervention by the manufacturer 34 is not required, at processing block 705, channel partner content and other specific information corresponding to the transmitted channel partner identifier are retrieved from the database 18. Next, at processing block 706, an electronic communication is transmitted to the end user 36, the communication containing the channel partner content and order access information. Finally, at processing block 707, the manufacturer web site is updated to include the channel partner 34 content and other specific information, such that the site presents the end user 36 with a view of the corresponding channel partner 34.

As mentioned above, data processing entities such as the web servers 12, communication servers 14, processing servers 16, database 18, library 19, and the like may be implemented in various forms. One example is a digital data processing machine, as exemplified by the computer system 800 of FIG. 8.

Figure 8:
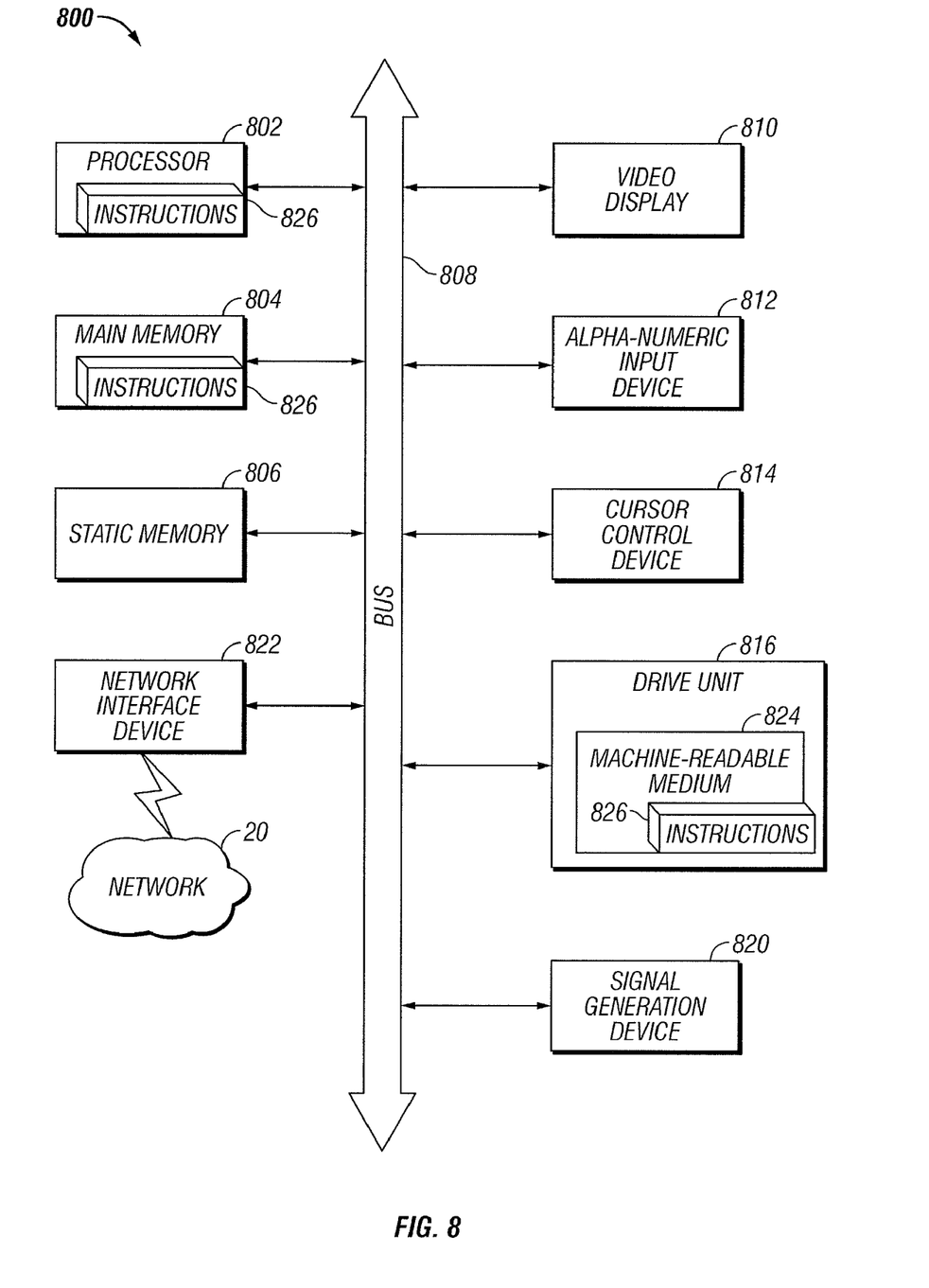
FIG. 8 is a diagrammatic representation of a machine in the exemplary form of a computer system within which a set of instructions may be executed.

FIG. 8 shows a diagrammatic representation of a machine in the exemplary form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810, e.g. a liquid crystal display (LCD) or a cathode ray tube (CRT). The computer system 800 also includes an alphanumeric input device 812, e.g, a keyboard, a cursor control device 814, e.g. a mouse, a disk drive unit 816, a signal generation device 818, e.g. a speaker, and a network interface device 820.

The disk drive unit 816 includes a machine-readable medium 824 on which is stored a set of instructions, i.e. software, 826 embodying any one, or all, of the methodologies described above. The software 826 is also shown to reside, completely or at least partially, within the main memory 804 and/or within the processor 802. The software 826 may further be transmitted or received via the network interface device 820.

In contrast to the system 800 discussed above, a different embodiment of the invention uses logic circuitry instead of computer-executed instructions to implement processing entities such as the web servers 12, processing servers 16, etc. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A computer-implemented method of delivering software of a predetermined manufacturer to end users via prescribed channel partners, where said prescribed channel partners include prescribed vendors of said software from said manufacturers to end users, or prescribed distributors of said software from said manufacturers to said vendors, or said vendors and said distributors, and where at least some of the end users are separate from the channel partners, the method comprising operations of:
a first computer-implemented operation comprising:
responsive to an end user transmitting a machine-readable order for a given product to a first one of the channel partners, the first channel partner performing substantially simultaneous operations of:
transmitting a machine-readable purchase order to said manufacturer, the purchase order omitting end user shipping information;
forwarding said purchase order to a third party electronic software digital management (ESDM) system, said ESDM system separate from the channel partners and the manufacturer;
a second computer-implemented operation comprising:
following receipt of the purchase order from the first channel partner, the ESDM system retrieving information including predetermined content prescribed for the first channel partner;
a third computer-implemented operation comprising: following the second operation, the ESDM system transmitting machine-readable communication including the retrieved content and order access information to the end user either directly or via the first channel partner; and
a fourth computer-implemented operation comprising:
responsive to the manufacturer receiving a user request to download the given product via a manufacturer site, the manufacturer performing operations comprising:
using information including said predetermined content prescribed for the first channel partner to present the end user with a prescribed view defined by said first channel partner; and
providing download of the given product to the end user.

2. The method of claim 1, further comprising:
before the second operation, determining whether preestablished settings require manufacturer authorization to release and fulfill the order, and responsive to manufacturer authorization being required, proceeding to said third operation only upon obtaining said authorization from the manufacturer.

3. The method of claim 2, where the operation of obtaining authorization from the manufacturer is conducted such that the ESDM system provides a limited amount of information from said order to the manufacturer.

4. The method of claim 1, further comprising:
the ESDM system preventing access by the manufacturers to selected information from end user accounts initiated by said channel partners, said selected information including end user name and end user address; and
the ESDM system providing access by the manufacturers to selected order information comprising order number, channel partner identifier, order quantity, order date, software license key.

5. The method of claim 1, further comprising:
from the manufacturer, the ESDM system receiving definition of partner tables specifying actions that each channel partners is allowed to perform while accessing the ESDM system, where said actions include the following types:

accounts permissions defining permissible channel partner addition and modification of accounts;

order permissions defining permissible channel partner processing and modifying or orders;

product management permissions defining permissible channel partner addition and modification of stored product information;

allowing or restricting actions performed by each channel partner according to the partner tables.

6. A computer-implemented system for delivering software, comprising:

a computer-driven manufacturer system operated by a software manufacturer;

multiple computer-driven channel partner systems each operated by a different one of multiple prescribed channel partners, each channel partner including prescribed vendors of said software from said manufacturers to end users, or prescribed distributors of said software from said manufacturers to said vendors, or said vendors and said distributors, where at least some of the end users are separate from the channel partners;

a third party, computer-driven, electronic software digital management (ESDM) system coupled to the manufacturer system and the channel partner system, the ESDM system separate from the channel partner systems and the manufacturer system;

where the manufacturer system, channel partner systems, and ESDM system are programmed to perform operations comprising:

a first computer-implemented operation comprising: responsive to an end user transmitting a machine-readable order for a given product to a first one of the channel partner systems, the first channel partner system performing substantially simultaneous operations of:

transmitting a machine-readable purchase order to said manufacturer system, the purchase order omitting end user shipping information;

forwarding said purchase order to the ESDM system;

a second computer-implemented operation comprising: following receipt of the purchase order from the first channel partner system, the ESDM system retrieving information including predetermined content prescribed for the first channel partner;

a third computer-implemented operation comprising: following the second operation, the ESDM system transmitting machine-readable communication including the retrieved content and order access information to the end user either directly or via the first channel partner system; and a fourth computer-implemented operation comprising: responsive to the manufacturer system receiving a user request to download the given product via a manufacturer site, the manufacturer performing operations comprising:

using information including said predetermined content prescribed for the first channel partner to present the end user with a prescribed view defined by said first channel partner; and providing download of the given product to the end user.

* * * * *